Aug. 27, 1957 V. J. HAWKS 2,804,596

BALANCED AMPLITUDE MODULATION WITH REINSERTED CARRIER

Filed Sept. 17, 1954

INVENTOR
V. J. HAWKS
BY R. B. Ardis
ATTORNEY

United States Patent Office 2,804,596

Patented Aug. 27, 1957

2,804,596

BALANCED AMPLITUDE MODULATION WITH REINSERTED CARRIER

Verl J. Hawks, Morristown, N. J., assignor to Bell Telephone Laboratories, Incorporated, New York, N. Y., a corporation of New York Application September 17, 1954, Serial No. 456,740

3 Claims. (Cl. 332—43)

Figure 1:
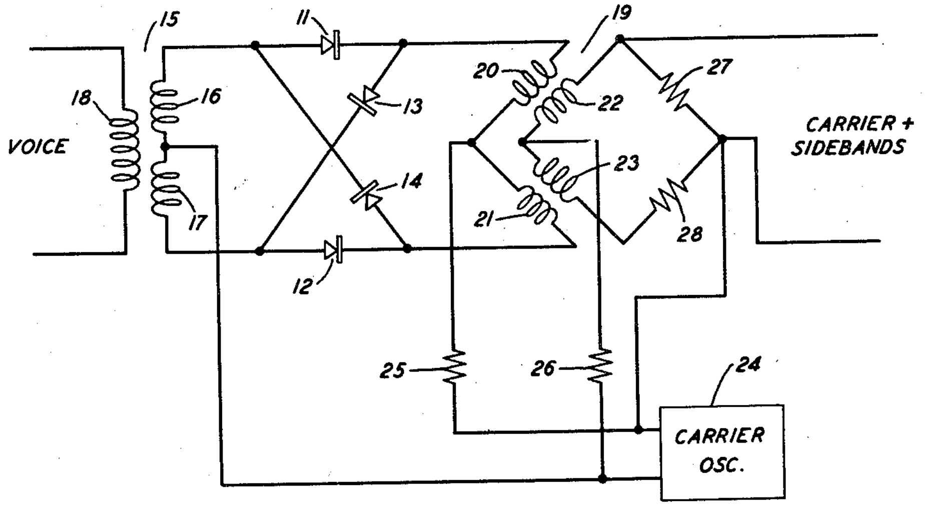

This invention relates generally to double-sideband amplitude modulation and more particularly to double-sideband amplitude modulation in which carrier is transmitted along with the sidebands.

A principal object of the invention is to balance out voice signals completely from a double-sideband amplitude modulation system and still transmit carrier along with the upper and lower sidebands.

Another and more particular object is to avoid the necessity of filtering out voice-frequency components from the output of a double-sideband, carrier-transmitted amplitude modulation system.

A further object is to add carrier to the output of a double-sideband amplitude modulation system without transmitting it backwards through the modulator into the voice signal channel.

For many forms of signal transmission on a carrier-frequency basis, the best performance is obtained when the carrier wave itself is transmitted along with both the upper and the lower signal sidebands. The transmitted carrier may then be used directly at the receiving end of the system to demodulate the sidebands. There is no danger of frequency distortion due to an incorrect demodulating carrier being used since the carrier undergoes the same frequency changes during transmission that the sidebands may undergo.

In a carrier telephone system, it is generally undesirable to have voice frequencies transmitted through the modulator out onto the carrier line since it may be necessary to use the carrier line for the voice-frequency transmission of another signal channel. Double-balanced modulators are often used, therefore, because in addition to transmitting both upper and lower sidebands, they block the transmission of voice. Since double-balanced modulators block the transmission of the unmodulated carrier wave as well as the transmission of voice, past practice, when it has been desired to transmit some carrier along with the sidebands, has been to unbalance the modulator slightly. With the modulator unbalanced, some carrier is transmitted along with the signal sidebands, the extent of carrier transmission depending upon the degree of the unbalance. Comparable amounts of voice and normally balanced-out products are also transmitted, but it has been the general practice to provide filters on the output side of the modulator to remove such unwanted components from the carrier line.

The prior art practice of unbalancing the modulator to obtain the transmission of a selected degree of carrier may not, however, be completely satisfactory when the carrier frequencies used are close to the voice band. Such is the case in the transistorized rural carrier telephone transmission system forming the basis for copending application Serial No. 445,099, filed September 10, 1954, by V. J. Hawks, E. K. Van Tassel, and D. C. Weller. Under such circumstances, the transmitted voice frequencies are not easily separated from the carrier frequencies by filters, and the sharply selective filters needed tend to be complex, bulky, and expensive. The present invention solves this problem and permits carrier to be transmitted along with both upper and lower signal sidebands without permitting the transmission of any voice. When the modulator balance is extremely high, filtering at the voice frequencies is completely avoided. In other instances, the filtering needed is reduced substantially from that required by the prior art. In addition, the invention avoids any possibility of unwanted transmission of carrier backwards through the modulator and into the voice channel.

In accordance with the present invention, a double-balanced amplitude modulator is provided with an auxiliary four-terminal impedance bridge connected to its output circuit to permit reinsertion of carrier for transmission along with the upper and lower sidebands produced by the modulator. The modulator output circuit is connected to one pair of diagonally opposite terminals of the bridge circuit and the carrier source, in addition to being connected to the carrier input circuit of the modulator, is connected to the other pair of diagonally opposite bridge terminals, conjugate to the first. The output transmission line, which in the prior art was connected directly to the modulator output circuit, is connected to a pair of adjacent bridge terminals forming a single arm of the bridge. The modulator itself remains balanced, causing voice frequencies supplied to the modulator to be balanced out completely and avoiding any necessity of using sharply selective filters to remove them. The balanced auxiliary bridge circuit also prevents the reinserted carrier from being transmitted backwards into the modulator and adversely affecting its balance.

Figure 2:
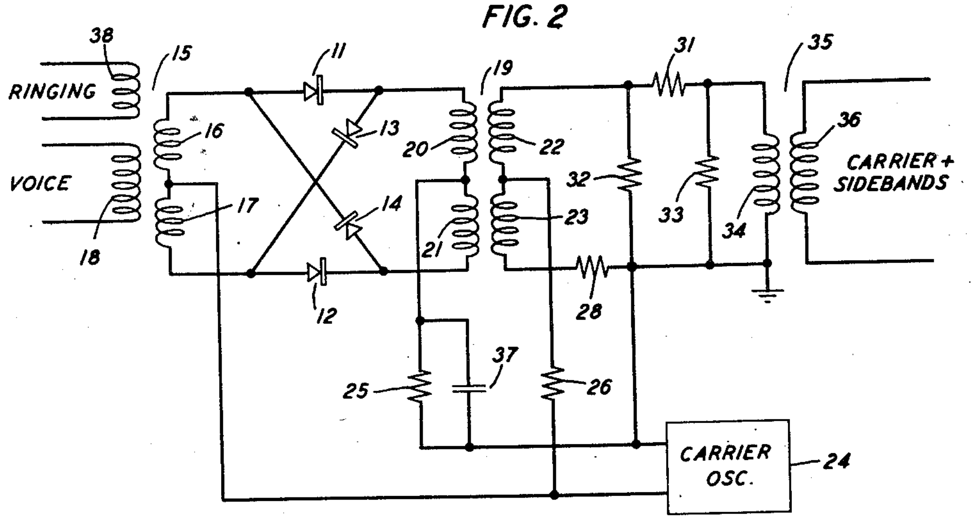

A more complete understanding of the invention and its various objects and features may be obtained by a study of the following detailed description of several specific embodiments. In the drawings:

Fig. 1 illustrates a double-balanced ring-type modulator embodying the invention; and Fig. 2 illustrates a double-balanced modulator like that of Fig. 1 embodying the invention and particularly suitable for use in the transistorized rural carrier telephone transmission system disclosed in the above-identified copending application by V. J. Hawks, E. K. Van Tassel, and D. C. Weller.

The specific embodiment of the invention illustrated in Fig. 1 includes a standard double-balanced ring-type modulator made up of four crystal diodes 11, 12, 13, and 14. Diodes 11, 12, 13, and 14 form a closed loop in which all diodes are poled in the same direction. A three-winding transformer 15 has two of its windings 16 and 17 connected in series from the junction between diodes 11 and 14 to that between diodes 12 and 13. The third winding 18 of transformer 15 is inductively coupled to windings 16 and 17 and forms a voice-frequency signal input path. On the other side of diodes 11, 12, 13, and 14, a four-winding transformer 19 has one pair of windings 20 and 21 connected in series from the junction between diodes 11 and 13 to the junction between diodes 12 and 14. The remaining two windings 22 and 23 of transformer 19 are inductively coupled to windings 20 and 21, respectively, and will be discussed subsequently at greater length.

The elements which have thus far been set forth form a double-balanced ring-type modulator in which voice-frequency signals are applied to winding 18 of transformer 15 and carrier is applied between the common points of windings 16 and 17 and 20 and 21, respectively. A double-sideband carrier-suppressed amplitude modulated output wave appears across windings 22 and 23 of transformer 19.

The actual carrier is provided to the modulator in Fig.

1 by a carrier-frequency oscillator 24 which may be, by way of example, the transistor oscillator disclosed in copending application Serial No. 456,661, filed September 17, 1954, Patent No. 2,763,726, by E. K. Van Tassel and R. E. Yaeger. One side of oscillator 24 is connected to the common point between windings 16 and 17, while the other is connected through a small resistor 25 to a point between windings 20 and 21.

In accordance with a principal feature of the present invention, a four-terminal bridge circuit is connected to the output circuit of the modulator in Fig. 1 in order to permit reinsertion of the carrier in the modulator output without necessitating any unbalancing of the modulator to voice. The side of carrier oscillator 24 connected to windings 16 and 17 is also connected through a resistor 26 to a point between windings 22 and 23 of transformer 19. A pair of resistances 27 and 28 are connected in series across windings 22 and 23, and the final carrier plus double-sideband output is taken from the bridge across resistor 27. The side of oscillator 24 connected to resistor 25 is also connected to the junction between resistors 27 and 28 to complete the carrier connection to the auxiliary bridge.

Windings 22 and 23 and resistors 27 and 28 form a balanced four-terminal impedance bridge in the output circuit of the modulator illustrated in Fig. 1. The carrier voltage is applied across the pair of diagonally opposite or conjugate terminals formed by the junction between windings 22 and 23 and that between resistors 27 and 28. Since the bridge is balanced, there is no carrier transmission back through transformer 19 into the modulator which could possibly affect adversely the balance of the latter. However, since the output is taken across resistor 27, which forms only one arm of the bridge, carrier is transmitted through resistor 27 onto the outgoing line. Since the double-sideband output of the modulator is transmitted through transformer 19 into windings 22 and 23 thereof, the two sidebands also appear across resistor 27 and are transmitted through resistor 27 with the carrier out onto the carrier line. The magnitude of the transmitted carrier is controlled by varying the magnitude of resistor 26.

Application of carrier at both the carrier input and the modulator output circuits of the modulator illustrated in Fig. 1 effectively unbalances the modulator. Such unbalance is prevented by the present invention since the balanced bridge in the modulator output circuit prevents backward transmission of the carrier. The invention, furthermore, permits this result to be realized without either increasing the power drawn from the carrier source or providing amplification in the carrier reinsertion path.

The embodiment of the invention illustrated in Fig. 2 is suitable for use directly as modulators 65 and 147 in Figs. 2 and 3A, illustrating office and outlying carrier terminals respectively, of the rural carrier telephone transmission system disclosed in the above-identified copending application of V. J. Hawks, E. K. Van Tassel, and D. C. Weller. The modulator illustrated in Fig. 2 is the same as that illustrated in Fig 1 except that output resistor 27 in the auxiliary bridge circuit is replaced by a resistance pad made up of a series resistor 31 and two shunt resistors 32 and 33. The junction point of resistors 28 and 32 is grounded, and the primary winding 34 of an output transformer 35 is connected across resistor 33. The secondary winding 36 of transformer 35 is coupled to the outgoing carrier line.

The remaining distinctions between the modulator shown in Fig. 2 and that illustrated in Fig. 1 are that a condenser 37 is connected across resistor 25 in the oscillator lead to provide added control with respect to the carrier supplied to the balanced modulator over the phase of the carrier reinserted for transmission with the sidebands out over the carrier line and that transformer 15 is provided with an additional input winding 38 to carry the voice-frequency tones into which telephone subscriber ringing information may be coded. Further information regarding these possible ringing tones may be obtained from the above-identified copending application of V. J. Hawks, E. K. Van Tassel, and D. C. Weller and from copending application Serial No. 455,129, filed September 10, 1954, by D. C. Weller (U. S. Patent 2,763,726, issued September 18, 1956).

It is to be understood that the arrangements which have been described are illustrative of the application of the principles of the invention. Numerous other arrangements may be devised by those skilled in the art without departing from the spirit and scope of the invention.

What is claimed is:

1. In combination, a double-balanced ring-type modulator comprising four similarly poled asymmetrically conducting devices connected to form a first four-terminal bridge circuit, a first pair of substantially equal impedances connected in series between one pair of conjugate terminals of said first bridge circuit, a second pair of substantially equal impedances connected in series between the other pair of conjugate terminals of said first bridge circuit, a signal input circuit coupled across said first pair of impedances, a carrier input circuit coupled between the terminals formed by the junction between said first pair of impedances and the junction between said second pair of impedances, a third pair of substantially equal impedances connected in series between said other pair of conjugate terminals of said first bridge circuit, said second and third pairs of impedances forming a second balanced four-terminal bridge circuit, means to supply carrier to said second bridge circuit between the pair of conjugate terminals formed by the junction between said second pair of impedances and the junction between said third pair of impedances, and output means coupled across one of said third pair of impedances, whereby signals applied to said signal input circuit are balanced out completely in said modulator and are not transmitted to said output means, and carrier is inserted in said second bridge circuit for transmission to said output means with the sidebands produced by said modulator and is not transmitted backwards into said modulator.

2. In combination, a double-balanced ring-type modulabor comprising four similarly poled asymmetrically conducting devices connected to form a first four-terminal bridge circuit, first and second transformers each having a primary winding and a secondary winding, the primary winding of said first transformer forming a second input circuit and the secondary winding of said first transformer being center-tapped and connected between one pair of conjugate terminals of said first bridge circuit, the primary winding of said second transformer being center-tapped and connected between the other pair of conjugate terminals of said first bridge circuit and the secondary winding of said second transformer being center-tapped, a carrier input circuit coupled between the terminals formed by the mid-point of the secondary winding of said first transformer and the mid-point of the primary winding of said second transformer, a pair of substantially equal impedances connected in series across the secondary winding of said second transformer, said pair of impedances and the secondary winding of said second transformer forming a second balanced four-terminal bridge circuit, means to supply carrier to said second bridge circuit between the pair of conjugate terminals formed by the mid-point of the secondary winding of said second transformer and the junction between said pair of impedances, and output means coupled across one of said pair of impedances, whereby signals applied to said signal input circuit are balanced out completely in said modulator and are not transmitted to said output means, and carrier is inserted in said second bridge circuit for transmission to said output means with the sidebands produced by said modulator and is not transmitted backwards into said modulator.

3. In combination, a double-balanced ring-type modulator comprising four similarly poled asymmetrically conducting devices connected to form a first four-terminal bridge circuit, first and second transformers each having a primary winding and a secondary winding, the primary winding of said first transformer forming a second input circuit and the secondary winding of said first transformer being center-tapped and connected between one pair of conjugate terminals of said first bridge circuit, the primary winding of said second transformer being center-tapped and connected between the other pair of conjugate terminals of said first bridge circuit and the secondary winding of said second transformer being center-tapped, a first impedance and a second impedance, a carrier source having first and second output terminals, said first output terminal being connected to the terminal formed by the mid-point of the secondary winding of said first transformer and said second output terminal being connected through said first impedance to the terminal formed by the mid-point of the primary winding of said second transformer, a pair of substantially equal impedances connected in series across the secondary winding of said second transformer, said pair of impedances and the secondary winding of said second transformer forming a second balanced four-terminal bridge circuit, a connection from said second carrier source output terminal to the terminal formed by the junction between said pair of impedances, a connection from said first carrier source output terminal through said second impedance to the terminal formed by the mid-point of the secondary winding of said second transformer, and output means coupled across one of said pair of impedances, whereby signals applied to said signal input circuit are balanced out completely in said modulator and are not transmitted to said output means, and carrier is inserted in said second bridge circuit for transmission to said output means with the sidebands produced by said modulator and is not transmitted backwards into said modulator.

References Cited in the file of this patent

UNITED STATES PATENTS

| | | |
|---|---|---|
| 2,120,882 | Ballantine | June 14, 1938 |
| 2,136,606 | Bendel | Nov. 15, 1938 |